United States Patent Office 2,779,645
Patented Jan. 29, 1957

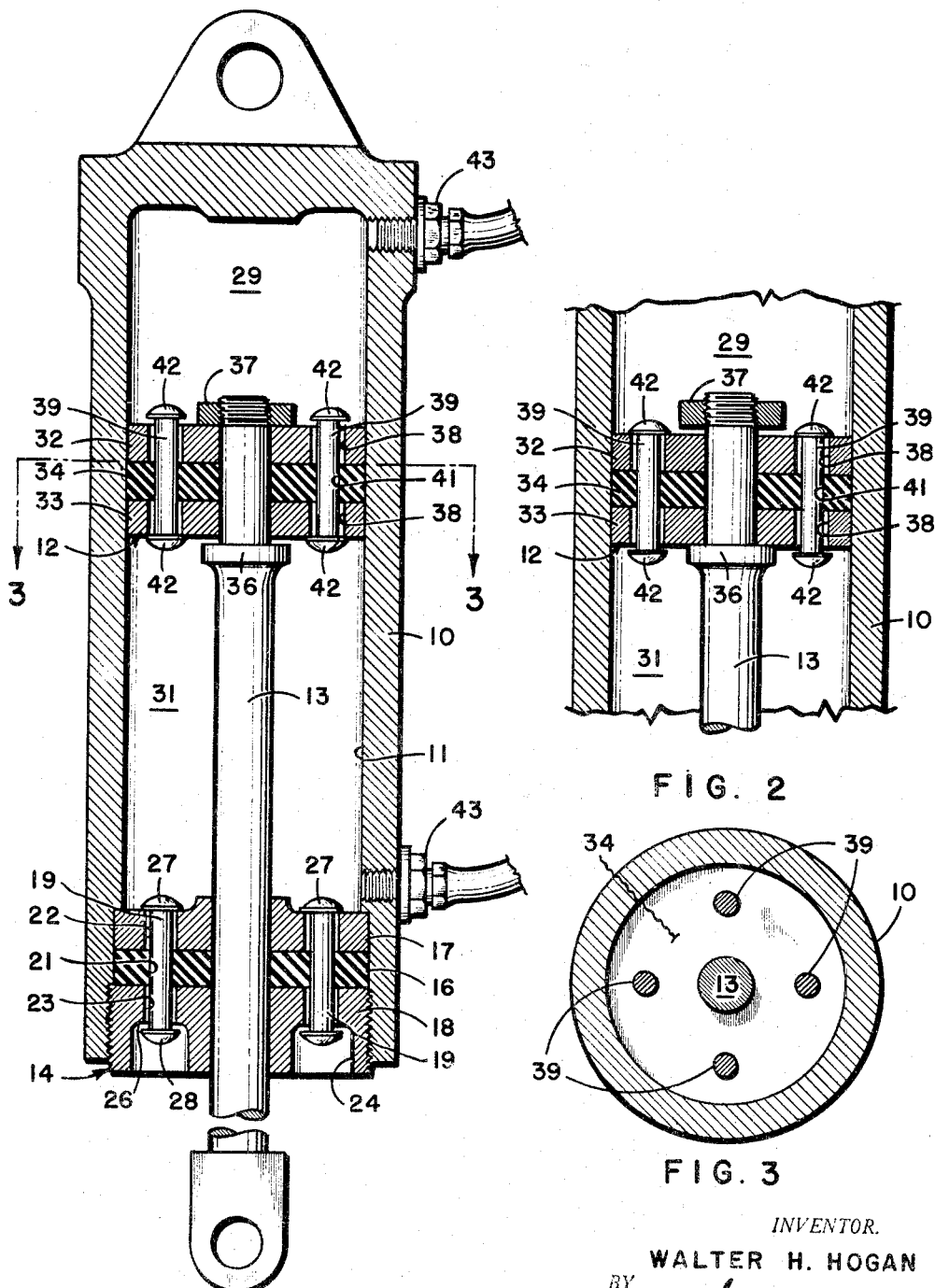

2,779,645

DOUBLE ACTING HIGH PRESSURE SEAL

Walter H. Hogan, Olmsted Falls, Ohio, assignor to The Cleveland Pneumatic Tool Company, Cleveland, Ohio, a corporation of Ohio Application October 14, 1954, Serial No. 462,214

4 Claims. (Cl. 309—23)

This invention relates generally to a packing for sealing fluids under pressure and more particularly to a packing wherein means are provided to automatically vary the sealing force so as to maintain a satisfactory seal under wide variations in fluid pressure.

A packing according to this invention is capable of providing a satisfactory seal in extremely high pressure ranges such as are encountered in shock absorbers, actuators and the like. To accomplish this sealing action, the packing is provided with means for increasing the sealing pressure of the packing in proportion to the pressure being sealed.

It is an important object of this invention to provide a new and improved packing for high pressures.

It is another object of this invention to provide a double-acting packing capable of withstanding large differential pressures across the packing in either direction.

It is still another object of this invention to provide a new and improved packing wherein the sealed pressure in the packing is increased as the fluid pressure increases and maintained at a pressure higher than the pressure being sealed.

Further objects and advantages will appear from the following description and drawings, wherein:

Figure 1 is a longitudinal section of a cylinder and piston provided with packings according to this invention;

Figure 2 is a fragmentary section of the double-acting packing assembly showing the position the elements assume when the fluid pressure above the packing is higher than the fluid pressure below; and, Figure 3 is a cross section taken along 3—3 of Figure 1.

For a clear understanding of this invention, reference should be made to Figure 1 wherein two packings are disclosed. A cylinder 10 is formed with an axially extending cavity 11 adapted to receive a packing assembly 12 mounted on the end of a piston rod 13. Another packing assembly 14 is positioned in the end of the cylinder 10 and provides a fluid seal between the walls of the cylinder 10 and the piston rod 13.

The packing assembly 14 comprises a resilient packing member 16, a pressure plate 17 on one side, a backing plate 18 on the other side and two or more plungers 19 extending therethrough. The backing plate 18 is positioned at the outer end of the cylinder and is provided with a threaded connection therewith to securely maintain the packing assembly 14 in its position. The plungers 19 are symmetrically positioned around the piston rod 13 in apertures 21, 22 and 23 formed in the packing member 16, pressure plate 17 and backing plate 18 respectively. The apertures 22 and 23 may provide a loose fit with the plunger but the aperture 21 should provide a close fit. The backing plate 18 is also formed with larger bores 24 aligned with apertures 23 connected by a radial shoulder 26. On one end, the plunger is formed with a head 27 having a diameter larger than the aperture 22 to limit the axial motion of the plungers 19 relative to the pressure plate 17 toward the backing plate 18 and the other end of the plunger is formed with a peened over portion 28 adapted to engage the shoulder 26 to prevent the plunger from falling out of the apertures. This structure thus permits the use of simple inexpensive rivets and easy assembly techniques in the manufacture of the packings. The pressure plate 17, the packing member 16 and the backing plate 18 are also provided with apertures adapted to receive and closely fit the piston rod to provide a bearing and seal therewith.

The packing assembly 12 is mounted on the forward end of the piston rod 13 dividing the cylinder into two fluid chambers 29 and 31 and includes two pressure plates 32 and 33 positioned on either side of a packing member 34. The plates 32 and 33 and the packing member 34 are all provided with apertures adapted to receive and closely fit the end of the rod 13 which is formed with a shoulder 36, to limit axial movement of the pressure plate 33 downwardly as shown in Figure 1, and the nut 37, threaded on the piston rod 13, to limit axial motion of the pressure plate 32 upwardly. The pressure plates 32 and 33 are provided with a plurality of apertures 38 adapted to loosely receive plungers 39 while the packing member 34 is formed with apertures 41 adapted to receive and closely fit the plungers. Although the plungers 39 are axially movable relative to both the pressure plates 32 and 33 and the packing member 34 through a limited distance, each end of the plunger is provided with a head 42 adapted to engage the exterior surfaces of the pressure plates 32 and 33 and limit the axial motion of the plunger relative thereto. In the drawings all of the clearances are exaggerated to assist in a clear understanding of the invention and to show that the manufacturing tolerances may be large. However, in practice, an axial preload may be applied to the packing by either the plungers or the nut 37 if desired. Fluid ports 43 are formed in the cylinder 11 opening into each of the chambers 29 and 31 to provide means for conducting fluid to and from the chambers.

The operation of both of the packing assemblies 12 and 14 is very similar and an understanding of their operation may be achieved by first considering the single-acting packing assembly 14. The structure of the packing assembly 14 is designed to seal against fluid pressure across the packing when the pressure within the chamber 31 is higher than the pressure outside the cylinder. In most cases the cylinder's external pressure is atmospheric pressure and the fluid is air. The fluid within the chamber 31 provides forces compressing the packing member 16 by two general means. The first is produced by the fluid pressure acting upon the cross sectional area of the pressure plate 17 which is substantially equal to the cross sectional area of the packing member and produces a pressure per unit area in the packing member equal to the fluid pressure within the chamber 31. Since the packing member 16 is resilient, this pressure per unit area is transmitted to all the surfaces of the packing member causing a sealing engagement between the radial surfaces of the packing member 16 and the radial surfaces of the cylinder 10, piston rod 13 and plungers 19 substantially equal to the pressure in the chamber 31. Those skilled in the art will recognize that the transfer of pressure per unit area to all of the surfaces of a resilient member is very efficient when the deflections are very small as in the instant case.

If a seal is maintained along the engagement between the packing member 16 and pressure plate 17, the axial force will be applied by the pressure plate to the packing member. However, if fluid penetrates into the area of engagement between the pressure plate 17 and the packing member 16, this fluid will maintain a pressure per unit area within the packing member equal to the pressure within the chamber 31. It is, therefore, apparent that it is immaterial whether a fluid penetrates along the engagement between the pressure plate and the packing member insofar as the operation of this packing assembly is concerned.

The reaction of the fluid on the plungers 19 produces a second axial force on the packing member 16 because only the left hand ends of the plungers are subjected to high pressure fluid. This force will be equal to the fluid pressure times the cross sectional area of the plungers in the zone where they pass through the packing member 16. This axial force is transmitted by the engagement between the heads 27 to the pressure plate and into the packing member 16 where it produces the second force for the compression of the packing member. These two forces, the first due to the direct action of the fluid pressure on the packing member and the second force caused by the fluid pressure acting on the plunger add together to produce a pressure per unit area in the packing member which is higher than the fluid pressure within the chamber 31. Because the packing member is resilient a sealing pressure results between all the radial surfaces which is greater than the fluid pressure and leakage is prevented regardless of the pressure applied. It is apparent, therefore, to those skilled in the art that the fluid under pressure acts on an area equal to the sum of the cross sectional areas of the plungers 19 and the packing member 16 and this total force causes a reaction upon only the cross sectional area of the packing member.

The differential operation of the double-acting packing assembly 12 is similar to the operation of the packing assembly 14. However, in this case the packing assembly is adapted to withstand differential pressures from either side. The two pressure plates 32 and 33 and the packing member 34 are all axially movable relative to the piston rod 13 within the limits defined by the shoulder 36 and the nut 37. Also the plungers 39 are all axially movable relative to the pressure plates 32 and 33 and the packing member 34 within the limits of movement defined by the heads 42. If the pressure within the chamber 31 is greater than the pressure within the chamber 29, the packing assembly 12 moves to the upward position against the nut 37 and the pressure plate 32 then functions in the same manner as the backing plate 18 of the packing assembly 14. In this case the elements assume the position shown in Figure 1 and the fluid pressure acts on the total cross sectional area of the packing member 34 plus the cross sectional areas of the plungers 39, but the force created by this action reacts only on the cross sectional area of the packing member 34. It is, therefore, apparent that the pressure per unit area in the packing member 34 exceeds the fluid pressure within the chamber 29 and provides an adequate seal.

If the pressure in the chamber 29 is greater than the pressure in the chamber 31, the packing member 33 engages the shoulder 36 and functions in the same manner as the backing plate 18. At the same time the pressure plate 32 and the plungers 39 function to produce a pressure per unit area in the packing member 34 greater than the fluid pressure in the chamber 29 so here again an adequate seal is provided.

Those skilled in the art will recognize that, by varying the size of the cross sectional area of the packing members 16 and 34 relative to the size of the cross sectional areas of the plungers 19 and 39, it is possible to achieve substantially any desired pressure per unit area within the packing members for a given fluid pressure being sealed.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A double acting packing assembly for providing a fluid seal between two elements comprising resiliently deformed packing radially confined by said elements and axially confined by first and second radial members, both of said radial members being mounted on one of said elements for axial motion relative thereto, means on said one element limiting axial motion of each of said radial members relative thereto in only the direction away from said packing, a plunger extending through said packing and members formed with a head at each end engageable with the adjacent member limiting axial motion of the plunger relative to the adjacent member in only the direction toward the remote member.

2. A double acting packing assembly for providing a fluid seal between two elements comprising resiliently deformable packing radially confined by said elements and axially confined between first and second radial members, both of said radial members being mounted on one of said elements for axial motion relative thereto, means on said one element limiting axial motion of each of said radial members relative thereto in only the direction away from said packing, and plunger means extending through said packing into said members formed with stop means limiting axial motion of said plunger means relative to each member in only the direction toward the other member.

3. A double acting packing assembly providing a fluid seal between a cylindrical body element and an axially movable rod element extending into said cylinder comprising a resiliently deformable packing radially confined by said cylinder and rod and axially confined between first and second radial members, means on one of said elements limiting axial motion of each member in only the direction away from said packing, a plurality of axially extending plungers symmetrically spaced around said packing extending therethrough into said members, said plungers being axially movable relative to said packing and members and formed with a head portion at each end engageable with each member limiting axial motion of said plungers relative thereto in only the direction toward the other member.

4. A double-acting packing assembly for providing a fluid seal between two elements comprising a resilient deformable packing radially confined by said elements and axially confined by first and second radial members, said packing assembly being axially confined between shoulders on one of said elements limiting axial motion of each member only in a direction away from said packing, a plurality of plungers extending through said packing and said members axially movable relative thereto and formed with opposed shoulders each engageable with one of said members limiting axial motion of said plungers relative to each member in only the direction toward said packing, said plungers being exposed to fluid pressure on both sides of said packing assembly.

References Cited in the file of this patent

UNITED STATES PATENTS

| 1,725,836 | Solberg | Aug. 27, 1929 |
| 1,928,259 | McCabe | Sept. 26, 1933 |
| 2,308,149 | Bingham | Jan. 12, 1943 |
| 2,399,550 | Klein | Apr. 30, 1946 |
| 2,417,107 | Gregoire | Mar. 11, 1947 |
| 2,647,769 | Smith | Aug. 4, 1953 |